(12) United States Patent
Sim et al.

(10) Patent No.: US 8,600,969 B2
(45) Date of Patent: Dec. 3, 2013

(54) USER INTEREST PATTERN MODELING SERVER AND METHOD FOR MODELING USER INTEREST PATTERN

(75) Inventors: Jae-Cheol Sim, Daejeon (KR); Kang-Yong Lee, Daejeon (KR); Hwa-Shin Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 42 days.

(21) Appl. No.: 13/294,894

(22) Filed: Nov. 11, 2011

(65) Prior Publication Data

US 2012/0124089 A1    May 17, 2012

(30) Foreign Application Priority Data

Nov. 12, 2010   (KR) .......................... 10-2010-0112825

(51) Int. Cl.
    *G06F 17/30*    (2006.01)
(52) U.S. Cl.
    USPC .......................................... 707/706; 707/707
(58) Field of Classification Search
    USPC .................................. 707/706, 707
    See application file for complete search history.

(56) References Cited

U.S. PATENT DOCUMENTS

| | | | |
|---|---|---|---|
| 7,065,550 B2 | 6/2006 | Raghunandan | |
| 2003/0061239 A1 | 3/2003 | Yoon | |
| 2007/0239802 A1 | 10/2007 | Razdow et al. | |
| 2007/0250854 A1 | 10/2007 | Miyabayashi et al. | |
| 2008/0201310 A1 | 8/2008 | Fitzpatrick et al. | |
| 2008/0288439 A1* | 11/2008 | Chandley et al. ................. | 707/1 |
| 2010/0121821 A1 | 5/2010 | Kinoshita et al. | |

FOREIGN PATENT DOCUMENTS

| | | |
|---|---|---|
| EP | 1 087 310 A1 | 3/2001 |
| JP | 2004-297605 A | 10/2004 |
| JP | 2005-142975 A | 6/2005 |
| JP | 2005-293384 A | 10/2005 |
| KR | 10-2003-0026527 A | 4/2003 |
| KR | 10-2005-0109719 A | 11/2005 |

* cited by examiner

*Primary Examiner* — Baoquoc N To (57) ABSTRACT

A user interest pattern modeling server includes a history collection unit, a keyword extraction unit, a time pattern extraction unit, a keyword extension unit, a time pattern analysis unit and a pattern modeling unit. The history collection unit collects a user's use history of a content. The keyword extraction unit extracts a keyword from the use history of the content. The time pattern extraction unit extracts a first time pattern of the keyword. The keyword extension unit extracts an extended keyword through searching related words of the keyword. The time pattern analysis unit analyzes a second time pattern of the extended keyword based on the first time pattern. The pattern modeling unit models a user interest pattern for the keyword and the extended keyword based on the first and second time patterns.

17 Claims, 11 Drawing Sheets

```
111
2010-6-29 17:30:20
AVANTE, YONGSEONG CHO,
HYUNDAI MOTOR
```

```
121
2010-6-29 17:31:30
MARTIZ, TOSCA, CIVIC, AVANTE
```

```
131
2010-6-25 17:32:15
WORLD CUP, NATIONAL SOCCER TEAM,
JEONGMU HEO, SOUTH AFRICA,
SWISS
```

```
141
2010-3-12 13:25:18
MYUNGBAK LEE, SEJONG-SI,
HANNARA-DANG
```

```
132
2010-6-27 08:32:15
WORLD CUP, NATIONAL SOCCER TEAM,
JEONGMU HEO, SOUTH AFRICA,
ARGENTINA
```

```
142
2010-4-05 16:05:41
MYUNGBAK LEE,
LOCAL ELECTION, SEJONG-SI
```

```
143
2010-5-08 18:56:21
MYUNGBAK LEE, LOCAL ELECTION
```

```
133
2010-6-29 17:32:15
WORLD CUP, NATIONAL SOCCER TEAM,
JEONGMU HEO, CHUNSOO LEE,
PRIZE MONEY, SOUTH AFRICA, BRAZIL,
SET PIECE, RED DEVILS, DURI CHA
```

```
144
2010-6-22 19:19:01
MYUNGBAK LEE, HU JINTAO,
TORONTO, SUMMIT CONFERENCE
```

```
145
2010-6-29 16:28:15
CHEONAN SINKING, DIPLOMACY,
G20, MYUNGBAK LEE, HU JINTAO,
TORONTO, SUMMIT CONFERENCE
```

FIG. 5

| | APPEARANCE INTERVAL | | | PRVIOUS APPEARANCE TIME | |
|---|---|---|---|---|---|
| AVANTE | 1:10 | | AVANTE | BEFORE 1 DAY | |
| YONGSEONG CHO | | | YONGSEONG CHO | BEFORE 1 DAY | |
| HYUNDAI MOTOR | | | HYUNDAI MOTOR | BEFORE 1 DAY | |
| MARTIZ | | | MARTIZ | BEFORE 1 DAY | |
| TOSCA | | | TOSCA | BEFORE 1 DAY | |
| CIVIC | | | CIVIC | BEFORE 1 DAY | |
| WORLD CUP | 39:00 | 57:00 | WORLD CUP | BEFORE 1 DAY BEFORE 3 DAYS BEFORE 5 DAYS | |
| NATIONAL SOCCER TEAM | 39:00 | 57:00 | NATIONAL SOCCER TEAM | BEFORE 1 DAY BEFORE 3 DAYS BEFORE 5 DAYS | |
| JEONGMU HEO | 39:00 | 57:00 | JEONGMU HEO | BEFORE 1 DAY BEFORE 3 DAYS BEFORE 5 DAYS | |
| CHUNSOO LEE | | | CHUNSOO LEE | BEFORE 1 DAY | |
| PRIZE MONEY | | | PRIZE MONEY | BEFORE 1 DAY | |
| SOUTH AFRICA | 39:00 | 57:00 | SOUTH AFRICA | BEFORE 1 DAY BEFORE 3 DAYS BEFORE 5 DAYS | |
| ARGENTINA | | | ARGENTINA | BEFORE 3 DAY | |
| BRAZIL | | | BRAZIL | BEFORE 1 DAY | |
| SET PIECE | | | SET PIECE | BEFORE 1 DAY | |
| RED DEVILS | | | RED DEVILS | BEFORE 1 DAY | |
| DURI CHA | | | DURI CHA | BEFORE 1 DAY | |
| CHEONAN SINKING | | | CHEONAN SINKING | BEFORE 1 DAY | |
| DIPLOMACY | | | DIPLOMACY | BEFORE 1 DAY | |
| G20 | | | G20 | BEFORE 1 DAY | |
| MYUNGBAK LEE | 24 DAY 33 DAYS 47 DAYS 7 DAYS | | MYUNGBAK LEE | BEFORE 1 DAY BEFORE 7 DAYS BEFORE 1 MONTH BEFORE 2 MONTHS BEFORE 3 MONTHS | |
| HU JINTAO | | | HU JINTAO | BEFORE 1 DAY | |
| TORONTO | | | TORONTO | BEFORE 1 DAY | |
| SUMMIT CONFERENCE | | | SUMMIT CONFERENCE | BEFORE 1 DAY | |
| SEJONG-SI | | | SEJONG-SI | BEFORE 3 MONTHS BEFORE 4 MONTHS | |
| LOCAL ELECTION | 33 DAYS | | LOCAL ELECTION | BEFORE 1 MONTH | |

USER INTEREST PATTERN MODELING SERVER AND METHOD FOR MODELING USER INTEREST PATTERN

CROSS-REFERENCE TO RELATED APPLICATIONS

The present application claims priority of Korean Patent Application No. 10-2010-0112825, filed on Nov. 12, 2010, which is incorporated herein by reference in its entirety.

BACKGROUND OF THE INVENTION

1. Field of the Invention

Exemplary embodiments of the present invention relate to a content providing system; and, more particularly, to a user-based user interest pattern modeling server and a method for modeling a user interest pattern in a content providing system.

2. Description of Related Art

In general, a content providing system is a system for providing contents to users. The content providing system provides web services (e.g., internet) and multimedia services (e.g., a digital television (DTV) service, an internet protocol television (IPTV) service, a video on demand (VOD) service, a digital multimedia broadcasting (DMB) service, etc.) delivering contents. As an example, the contents provided from the content providing system includes web contents for providing web services and multimedia contents for providing multimedia services.

A user using the content providing system has a specific use pattern based on user's content use. Thus, a content manager or content provider can make a plan of content business by analyzing the user's content use pattern and managing contents interested by the user. For example, the content manager or content provider understands user's interests through the analysis of the user's content use pattern, so as to recommend or expose contents to the user.

In the current content providing system, only limited metadata are available. Therefore, the content providing system analyzes a user's content use pattern using only simple information contained metadata, such as a genre or actor, as the user uses multimedia contents. Social networking services are popular on the current web, and content services based on the web services are also popular. However, the user's content use pattern analysis based on the existing metadata cannot reflect a change in user's interest due to the limitation of metadata.

SUMMARY OF THE INVENTION

An embodiment of the present invention is directed to a user interest pattern modeling server and a method for modeling a user interest pattern, which can reflect trend of a user's interest.

Another embodiment of the present invention is directed to a user interest pattern modeling server and a method for modeling a user interest pattern, which can recommend contents corresponding to trend of a user's interest.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a user interest pattern modeling server includes a history collection unit configured to collect a user's use history of a content, a keyword extraction unit configured to extract a keyword from the use history of the content, a time pattern extraction unit configured to extract a first time pattern of the keyword, a keyword extension unit configured to extract an extended keyword through searching related words of the keyword, a time pattern analysis unit configured to analyze a second time pattern of the extended keyword, and a pattern modeling unit configured to model a user interest pattern for the keyword and the extended keyword based on the first and second time patterns.

The content may include at least one of a web content and a multimedia content.

The history collection unit may collect a user's content access time based on the use of the content.

The history collection unit may collect at least one of text data and metadata corresponding to the content.

The keyword extraction unit may extract the keyword from the text data and the metadata.

The keyword extraction unit may extract keyword appearance time for the extracted keyword from a content appearance time.

The first time pattern may include at least one of a burst pattern, a period pattern and a steady pattern with respect to the keyword.

The time pattern extraction unit may obtain a time interval from a current time to the keyword appearance time and a time interval between the keyword appearance times, and obtain the first time pattern from the time intervals using a statistical probability distribution function.

The second time pattern may include at least one of a burst pattern, a period pattern and a steady pattern with respect to the extended keyword.

The time pattern analysis unit may obtain a time interval from the current time to an extended keyword appearance time and a time interval between extended keyword appearance times based on a connection strength between the keyword and the extended keyword, and obtain the second time pattern from the time intervals using a statistical probability distribution function. The time pattern analysis unit may calculate a root mean square error (RMSE) or mean square error (MSE) for the time patterns.

The time pattern modeling unit may model the user interest pattern based on the keyword, the extended keyword, the first time pattern and the second time pattern.

The time pattern analysis unit may model the user interest pattern through selection of a time pattern having a minimum RMSE or MSE among the time patterns for the keyword and the extended keyword.

In accordance with another embodiment of the present invention, a method for modeling a user interest pattern in a user interest pattern modeling server includes collecting a user's use history of a content, extracting a keyword from the use history of the content, extracting a first time pattern of the keyword, generating an extended keyword from the keyword, analyzing a second time pattern of the extended keyword based on the first time pattern, and modeling a user interest pattern for the keyword and the extended keyword based on the first and second time patterns.

Said collecting of the use history of the content may include collecting a user's content access time based on the use of the content.

Said extracting of the keyword may extract keyword appearance times for the extracted keyword from the content access time.

Said extracting of the keyword may extract the keyword from a text data of the content and a metadata of the content.

The first time pattern may include at least one of a burst pattern, a period pattern and a steady pattern with respect to the keyword, and the second time pattern may include at least one of a burst pattern, a period pattern and a steady pattern with respect to the extended keyword.

DESCRIPTION OF SPECIFIC EMBODIMENTS

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Exemplary embodiments of the present invention relate to a content providing system; and more particularly, to a user interest pattern modeling server which can reflect trend of a user's interest (or terminal used by the user).

Figure 1:
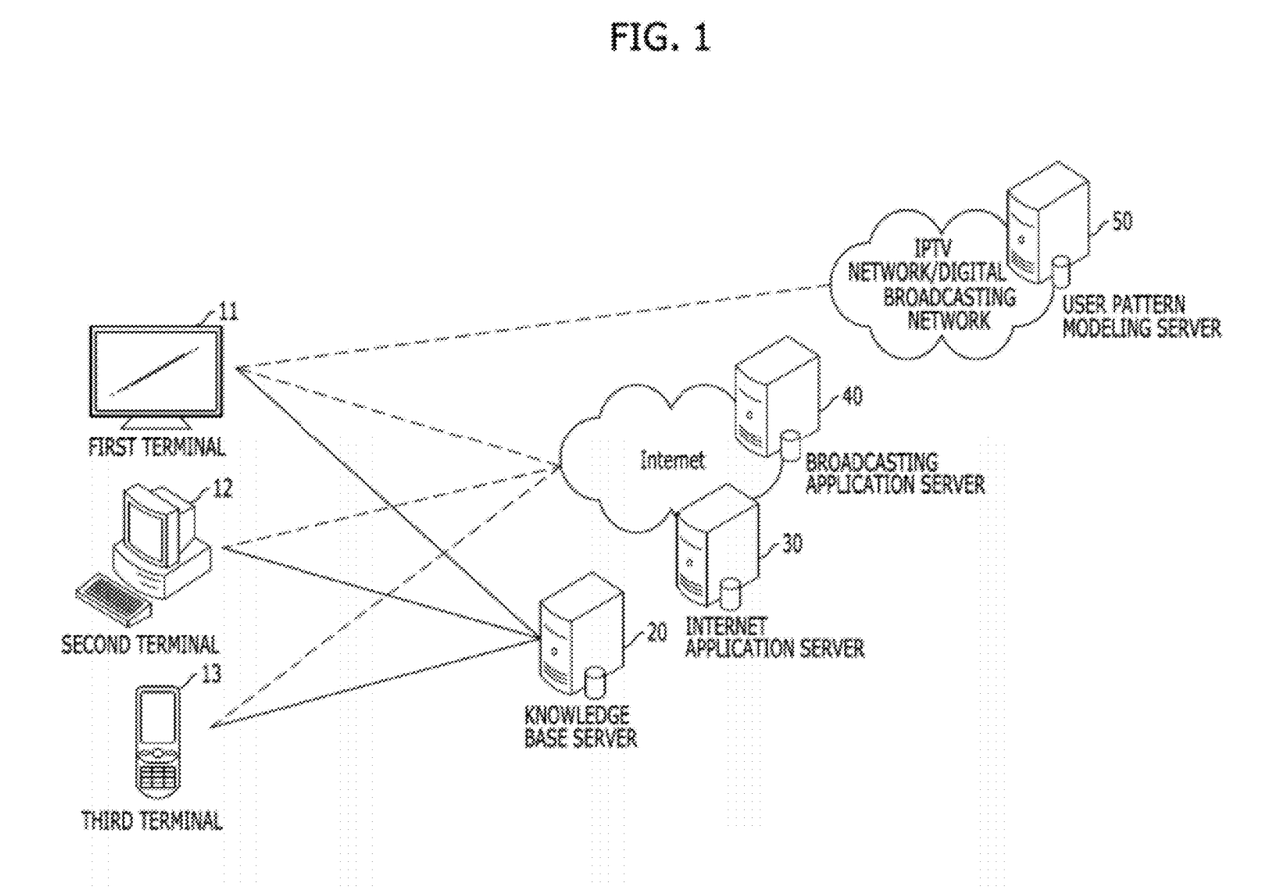
FIG. 1 illustrates a content providing system in accordance with an embodiment of the present invention.

FIG. 1 illustrates a content providing system in accordance with an embodiment of the present invention.

Referring to FIG. 1, the content providing system includes terminals 11, 12 and 13, a knowledge base server 20, an internet application server 30, a broadcasting application server 40 and a user interest pattern modeling server 50.

The terminals 11, 12 and 13 are user devices through which the content providing system is interfaced with a user. For example, contents include web contents provided with an internet network and multimedia contents provided through a broadcasting network. The web contents may be provided through the broadcasting network, and the multimedia contents may be provided through the internet. For example, the first terminal 11 is a television (TV), the second terminal 12 is a personal computer (PC), and the third terminal 13 is a mobile phone.

The terminals 11, 12 and 13 may be connected to the internet or broadcasting network so as to provide contents to each of the terminals.

The knowledge base server 20 is a server having the function of a search engine. The knowledge base server 20 may store relationships between various keywords. The knowledge base server 20 may identify relationships between keywords by crawling and analyzing web contents and dictionaries through an encyclopedia, a synonym dictionary, etc. When a keyword is searched, the knowledge base server 20 may output the related keywords and relationship between keywords.

The internet application server 30 provides application services based on web contents and/or multimedia contents to the terminals 11, 12 and 13 through the internet network.

The broadcasting application server 40 provides application services based on web contents and/or multimedia contents to the terminals 11, 12 and 13 through the broadcasting network.

The user interest pattern modeling server 50 collects a history based on the content use of each of the terminals 11, 12 and 13 (or users) from at least one of the terminals 11, 12 and 13, the internet application server 30 and the broadcasting application server 40. In addition, the user interest pattern modeling server 50 collects a content access time (content providing time, etc.) corresponding to each use of content.

The user interest pattern modeling server 50 obtains a keyword from contents and their metadata, and obtains a keyword (i.e., an extended keyword) extended from the obtained keyword.

The user interest pattern modeling server 50 extracts a first time pattern of the keyword based on a keyword appearance time. The user interest pattern modeling server 50 analyzes a second time pattern of the extended keyword based on a content appearance time. The user interest pattern modeling server 50 models a user's interest pattern through analyzing the time pattern (the first time pattern) for the keyword and the time pattern (the second time pattern) for the extended keyword.

The user interest pattern modeling server 50 may provide the modeled user's interest pattern to the internet application server 30 or the broadcasting application server 40. Alternatively, the user interest pattern modeling server 50 may provide the modeled user's interest pattern to the terminals 11, 12 and 13.

The content providing system described above can provide content services reflecting interest of the user (terminals 11, 12 and 13) depending on time by modeling a interest pattern based on appearance time of keywords in the user interest pattern modeling server 50.

Figure 2:
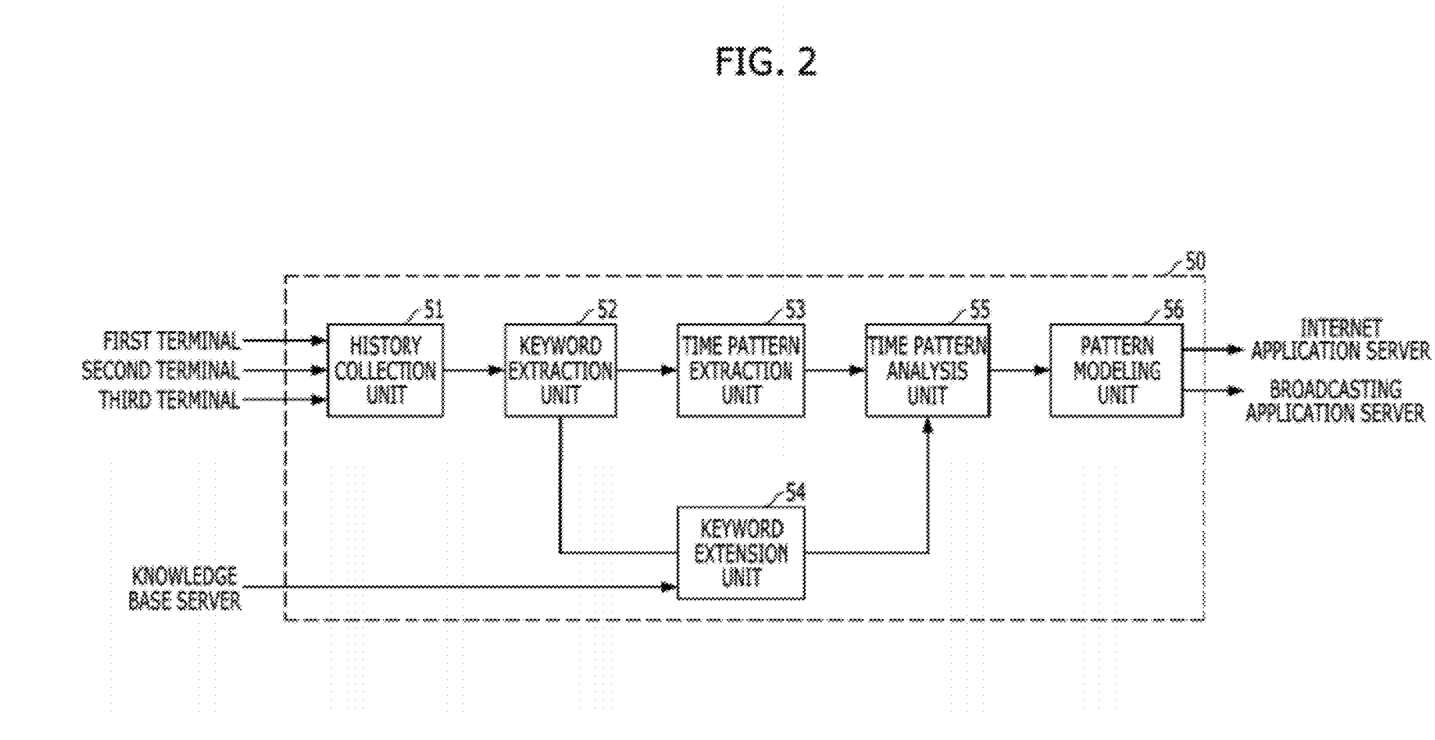
FIG. 2 illustrates a user interest pattern modeling server illustrated in FIG. 1.

FIG. 2 illustrates a user interest pattern modeling server illustrated in FIG. 1.

Referring to FIG. 2, the user interest pattern modeling server 50 includes a history collection unit 51, a keyword extraction unit 52, a time pattern extraction unit 53, a keyword extension unit 54, a time pattern analysis unit 55 and a pattern modeling unit 56.

The history collection unit 51 collects a user's content use history. For example, the content use history is information on contents used by terminals. The content use history includes information contained in contents (text data contained in a web page, etc.) or information on contents (e.g., metadata etc.). Here, the metadata is data for providing information related to contents, and may contain an electronic program guide (EPG), etc.

The history collection unit 51 may also collect a content appearance time, which is a time when a content is accessed by a user. For example, the history collection unit 51 may collect content use histories from the first to third terminals 11 to 13. The history collection unit 51 may collect a user's content use history through the internet application server 30 or broadcasting application server 40 for providing content services. In this case, the history collection unit 51 may collect the content appearance time together with the content use history from the first to third terminals 11 to 13 or the application server (the internet application server 30 or broadcasting application server 40).

The history collection unit 51 outputs the collected content use histories to the keyword extraction unit 52. The history collection unit 51 may output the collected content appearance times to the keyword extraction unit 52.

The keyword extraction unit 52 extracts a keyword from the content use histories. For example, the keyword extraction unit 52 may extract a keyword from text data contained in web contents or may extract a keyword from metadata of multimedia contents. When extracting a keyword, the keyword extraction unit 52 obtains an appearance time of the keyword extracted based on the content appearance time, i.e., a keyword appearance time. The keyword extraction unit 52 maps the extracted keyword and the keyword appearance time to each other.

The keyword extraction unit 52 may output the keyword appearance time mapped to the keyword together with the extracted keyword to the time pattern extraction unit 53. The keyword extraction unit 52 may provide the extracted keyword and the keyword appearance time to the keyword extension unit 54.

The time pattern extraction unit 53 extracts a time pattern for each keyword. The time pattern extraction unit 53 obtains a time interval from a current time to a keyword appearance time (hereinafter, referred to as an 'previous appearance time') and a time interval between keyword appearance times (hereinafter, referred to as a 'appearance interval'). The time pattern extraction unit 53 may obtain a time pattern using the obtained appearance interval or previous appearance time. Here, the time pattern includes at least one of a burst pattern (time pattern for a keyword in which a user's interest continuously increases), a period pattern (time pattern for a keyword in which a user is periodically interested) or a steady pattern (time pattern for a keyword in which a user is continuously interested for a long period of time).

The time pattern extraction unit 53 may obtain a time pattern (burst pattern, period pattern or steady pattern) using a statistical probability distribution function corresponding to the burst pattern, the period pattern or the steady pattern.

The time pattern extraction unit 53 outputs the obtained time pattern to the time pattern analysis unit 55.

The keyword extension unit 54 extracts an extended keyword by extending a keyword. The extended keyword is a keyword not contained in web contents or metadata provided to a practical user. The extended keyword is a keyword extracted from keywords having a meaningful connection relationship with the keyword. Therefore, the keyword extension unit 54 may search the knowledge base server 20 in which the semantic web technique is implemented so as to extend the keyword. The keyword extension unit 54 may extract a keyword related to the keyword, i.e., an extended keyword, through keyword searching. The keyword extension unit 54 outputs the extended keyword to the time pattern analysis unit 55.

The time pattern analysis unit 55 analyzes a time pattern for the extended keyword based on the time pattern extracted in the time pattern extraction unit 53. The extended keyword is a keyword not contained in web contents or metadata provided to a practical user. Therefore, a keyword providing time for the extended keyword does not exist. Accordingly, the time pattern analysis unit 55 analyzes the time pattern of the extended keyword based on the time pattern of the keyword.

The time pattern analysis unit 55 outputs the keyword, the time pattern extracted from the keyword, the extended keyword and the time pattern of the extended keyword to the pattern modeling unit 56.

The pattern modeling unit 56 generates a user interest pattern based on the user's content use using the keyword and the extended keyword. In this case, the pattern modeling unit 56 models a user's keyword access pattern reflecting user's interest depending on time from the time pattern extracted from the keyword and the time pattern of the extended keyword.

Thus, the terminals 11, 12 and 13, the internet application server 30 or the broadcasting application server 40 can use the user's keyword access pattern so as to understand a change in interest of the user using contents depending on time through the user interest pattern modeling server 50 for providing contents to the user. Accordingly, the terminals 11, 12 and 13, the internet application server 30 or the broadcasting application server 40 can recommend or provide contents reflecting user's interest depending on time to the user.

An embodiment of the operation of forming a user interest pattern in the user interest pattern modeling server 50 will be described with reference to FIGS. 3 to 10.

Figure 3:
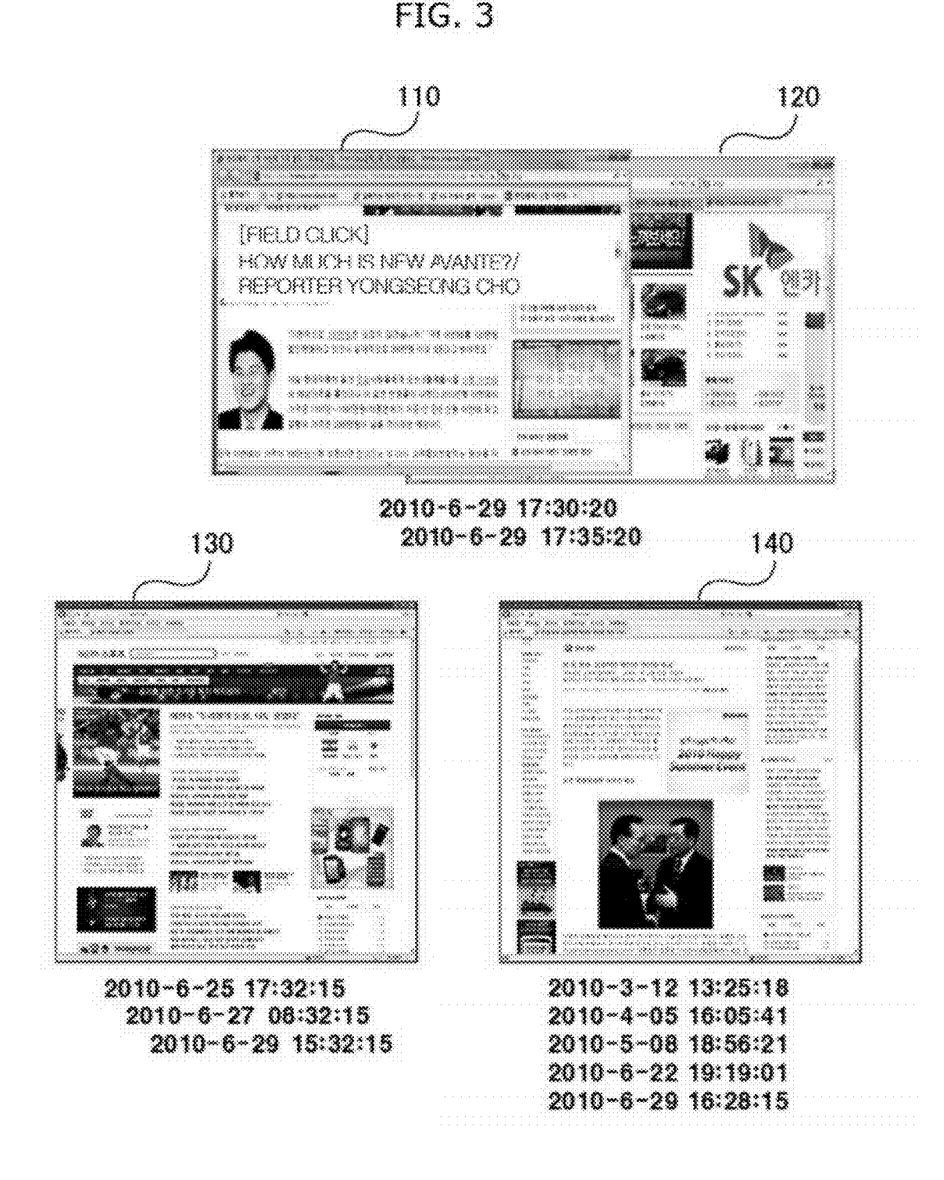
FIG. 3 illustrates web contents and web content appearance times, provided to a user in accordance with the embodiment of the present invention.

FIG. 3 illustrates web contents and web content appearance times, provided to a user in accordance with the embodiment of the present invention.

Referring to FIG. 3, there are illustrated web contents 110, 120, 130 and 140 provided to the second terminal 12, i.e., the user.

The first web content 110 contains contents related to a car. The second web content 120 contains contents related to a used car site. The content appearance times of the first and second web contents 110 and 120 are 'June 29, 2010 17:30:20' and 'June 29, 2010 17:35:20.'

The third web content 130 contains web contents related to sport news. The content appearance times of the third web content 130 are 'June 25, 2010 17:32:15,' 'June 27, 2010 08:32:15' and 'June 29, 2010 15:32:15.'

The fourth web content 140 contains web contents related to politics related news. The content appearance times of the fourth web content 140 are 'March 12, 2010 13:25:18,' 'April 5, 2010 16:05:41,' 'May 8, 2010 18:56:21,' 'June 22, 2010 19:19:01' and 'June 29, 2010 16:28:15.'

The history collection unit 51 collects a history based on user's content use from the second terminal 12 or the internet application server 30. The history collection unit 51 collects web content access times together with the web contents 110, 120, 130 and 140 as the history. The history collection unit 51 provides information on the collected history to the keyword extraction unit 52.

Figure 4:
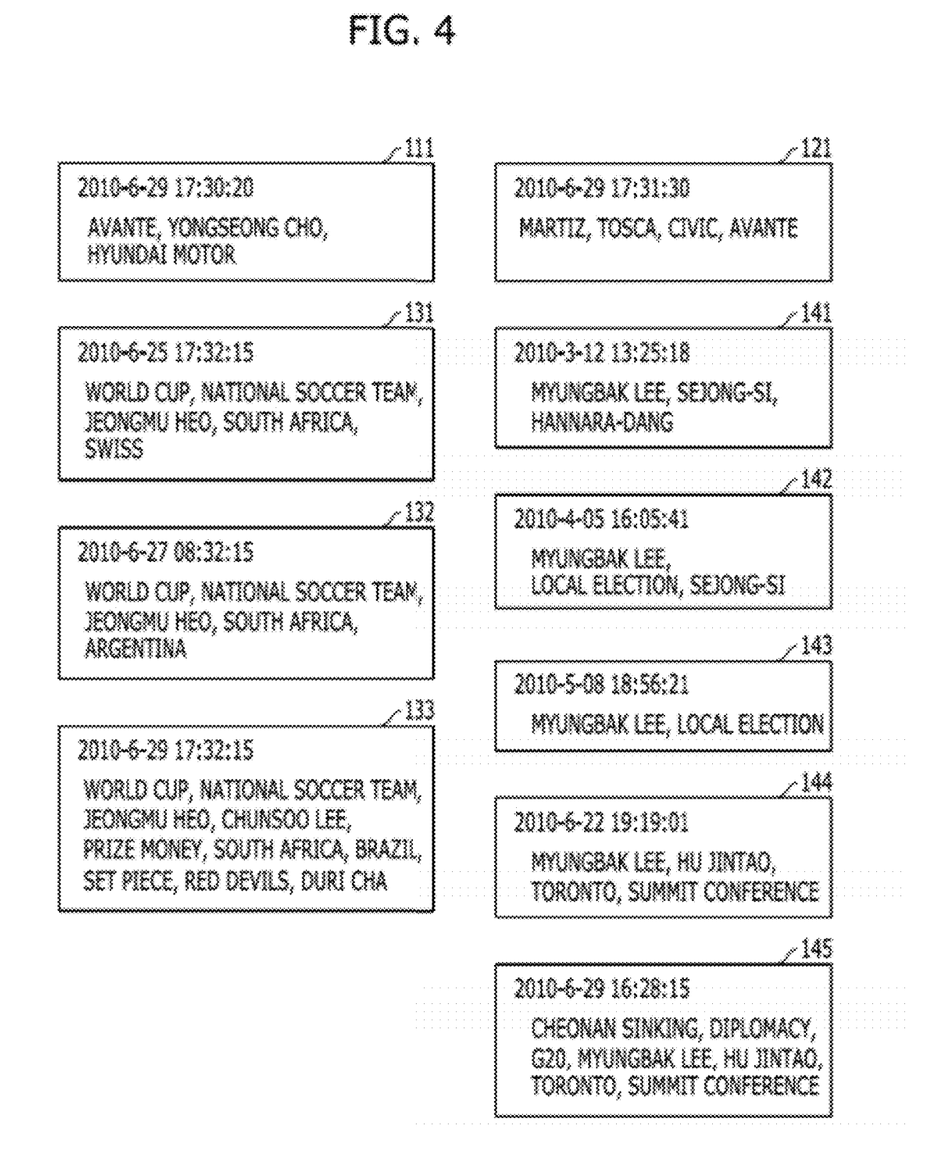
FIG. 4 illustrates keywords extracted for each time in accordance with the embodiment of the present invention.

FIG. 4 illustrates keywords extracted for each time in accordance with the embodiment of the present invention.

Referring to FIG. 4, the keyword appearance times are mapped to keywords extracted from text data contained in the web contents 110, 120, 130 and 140.

A first keyword 111 includes keywords (Avante, Yongseong Cho, and Hyundai Motor) extracted from the first web content 110 in the keyword extraction unit 52. The first keyword 111 includes a keyword appearance time (June 29, 2010 17:30:20) of the keywords extracted from the first web content 110.

A second keyword 121 includes keywords (Martiz, Tosca, Civic and Avante) extracted from the second web content 120 in the keyword extraction unit 52. The second keyword 121 includes a keyword appearance time (June 29, 2010 17:31:30) of the keywords extracted from the second web content 120.

A third keyword 131 includes keywords (World Cup, National Soccer Team, Jeongmu Heo, South Africa and Swiss) extracted from the third web content 130 in the keyword extraction unit 52. The third keyword 131 includes a keyword appearance time (June 25, 2010 17:32:15) of the keywords extracted from the third web content 130.

A fourth keyword 132 includes keywords (World Cup, National Soccer Team, Jeongmu Heo, South Africa and Argentina) extracted from the third web content 130 in the keyword extraction unit 52. The fourth keyword 141 includes a keyword appearance time (June 27, 2010 08:32:15) of the keywords extracted from the third web content 130.

A fifth keyword 133 includes keywords (World Cup, National Soccer Team, Jeongmu Heo, Chunsoo Lee, Prize Money, South Africa, Brazil, Set Piece, Red Devils and Duri Cha) extracted from the third web content 130 in the keyword extraction unit 52. The fifth keyword 133 includes a keyword appearance time (June 29, 2010 17:32:15) of the keywords extracted from the third web content 130.

A sixth keyword 141 includes keywords (Myungbak Lee, Sejong-Si and Hannara-Dang) extracted from the fourth web content 140 in the keyword extraction unit 52. The sixth keyword 141 includes a keyword appearance time (March 12, 2010 13:25:18) of the keywords extracted from the fourth web content 140.

A seventh keyword 142 includes keywords (and Sejong-Si) extracted from the fourth web content 140 in the keyword extraction unit 52. The seventh keyword 142 includes a keyword appearance time (April 5, 2010 16:05:41) of the keywords extracted from the fourth web content 140.

An eighth keyword 143 includes keywords (Myungbak Lee and Local Election) extracted from the fourth web content 140 in the keyword extraction unit 52. The eighth keyword 143 includes a keyword appearance time (May 8, 2010 18:56:21) of the keywords extracted from the fourth web content 140.

A ninth keyword 144 includes keywords (Myungbak Lee, Hu Jintao, Toronto and Summit Conference) extracted from the fourth web content 140 in the keyword extraction unit 52. The ninth keyword 144 includes a keyword appearance time (June 33, 2010 19:19:01) of the keywords extracted from the fourth web content 140.

A tenth keyword 145 includes keywords (Cheonan Sinking, Diplomacy, Myungbak Lee, Hu Jintao, Toronto and Summit Conference) extracted from the fourth web content 140 in the keyword extraction unit 52. The tenth keyword 145 includes a keyword appearance time (June 29, 2010 16:28:15) of the keywords extracted from the fourth web content 140.

As described above, the keywords and the keyword appearance times are extracted together from the contents by the keyword extraction unit 52, and managed by being mapped to each other.

Meanwhile, the keyword extraction unit 52 may exclude a keyword appearing in a predetermined number of times or less (e.g., 20 times or less) with respect to a content containing a plurality of keywords, such as a web document. The keyword extraction unit 52 may select only a predetermined number of frequently appearing keywords and then extract a keyword from the selected keywords.

The keyword extraction unit 52 may provide the extracted keywords and the keyword appearance times to the time pattern extraction unit 53 and the keyword extension unit 54.

Figure 5:
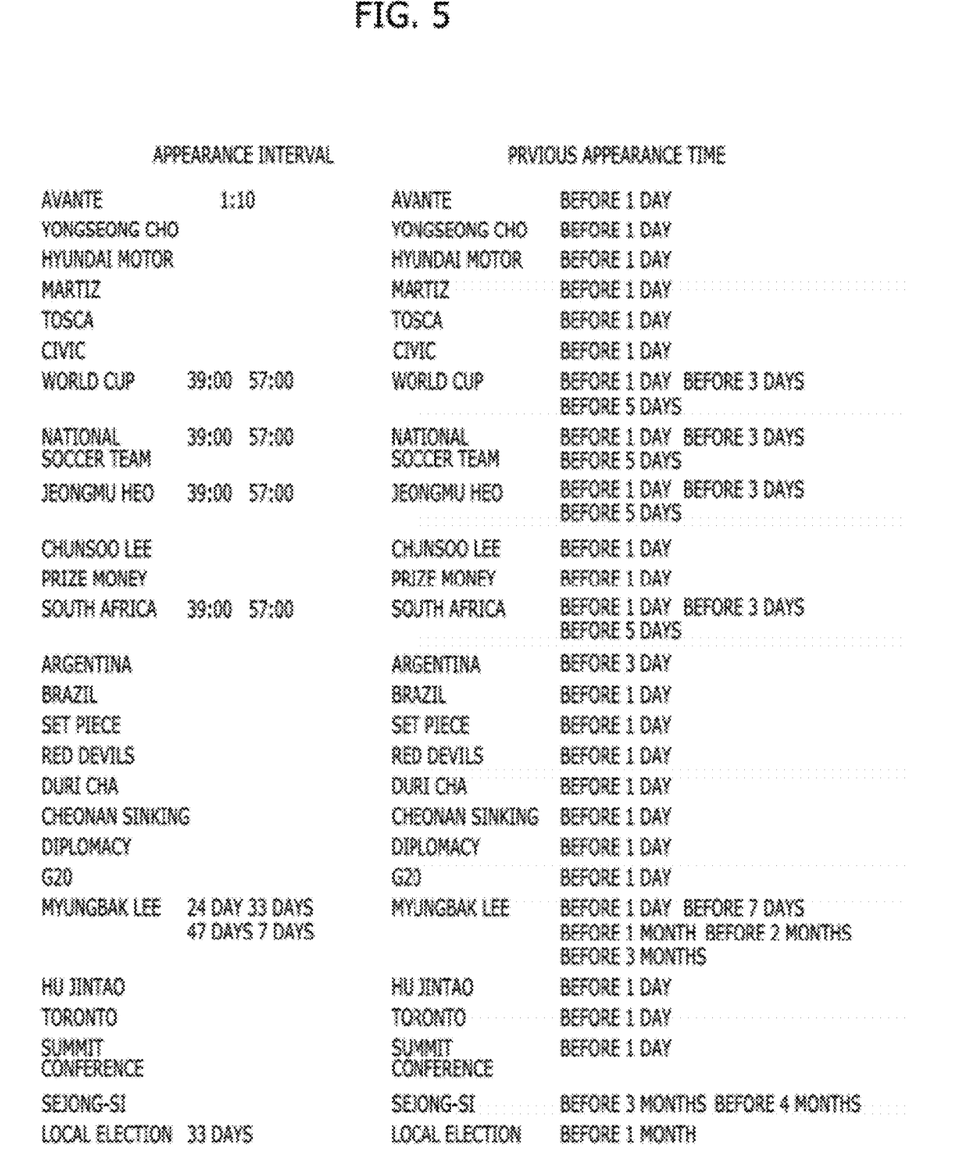
FIG. 5 illustrates appearance intervals and times of keywords in accordance with the embodiment of the present invention.

FIG. 5 illustrates appearance intervals and times of keywords in accordance with the embodiment of the present invention.

Referring to FIG. 5, there are illustrated an appearance interval (time interval between keyword appearance times) and a previous appearance time (time interval from a current time to a keyword appearance time) with respect to each of the keywords.

For example, the appearance interval of the keyword 'Avante' is '1 minute 10 seconds.' The previous appearance time of the keyword 'Avante' is before '1 day.'

The appearance intervals of the keyword 'South Africa' are '39 minutes' and '57 minutes.' The previous appearance times of the keyword 'South Africa' are before '1 day,' 3 days' and '5 days.'

The appearance interval of the keyword 'Local Election' is '33 days.' The previous appearance time of the keyword 'Local Election' is before '1 month.'

Like the aforementioned keywords, the appearance intervals and previous appearance times of the other keywords are illustrated in FIG. 5, and their detailed descriptions will be omitted.

The time pattern extraction unit 53 extracts the time interval and previous appearance time of each of the keywords so as to extract a time pattern of each of the keywords.

Figure 6A:
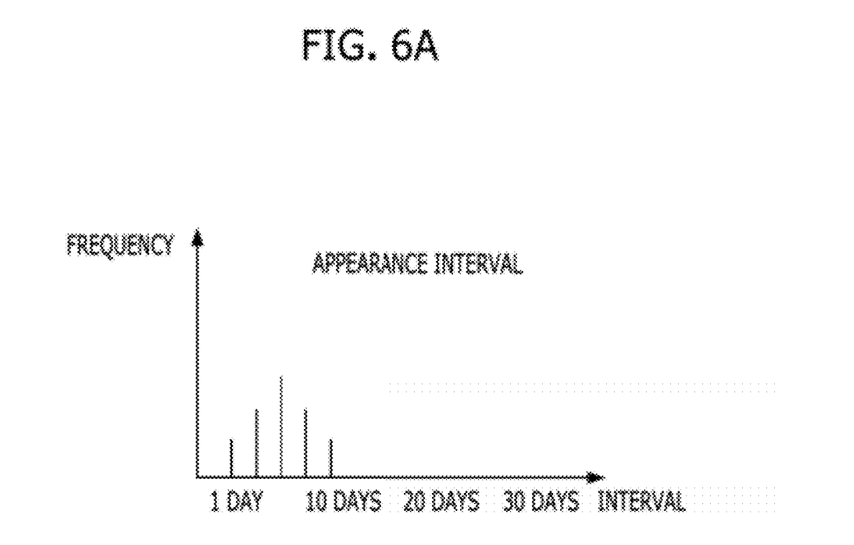
FIGS. 6A and 6B illustrate histograms for appearance intervals and previous appearance times in accordance with the embodiment of the present invention.
Figure 6B:
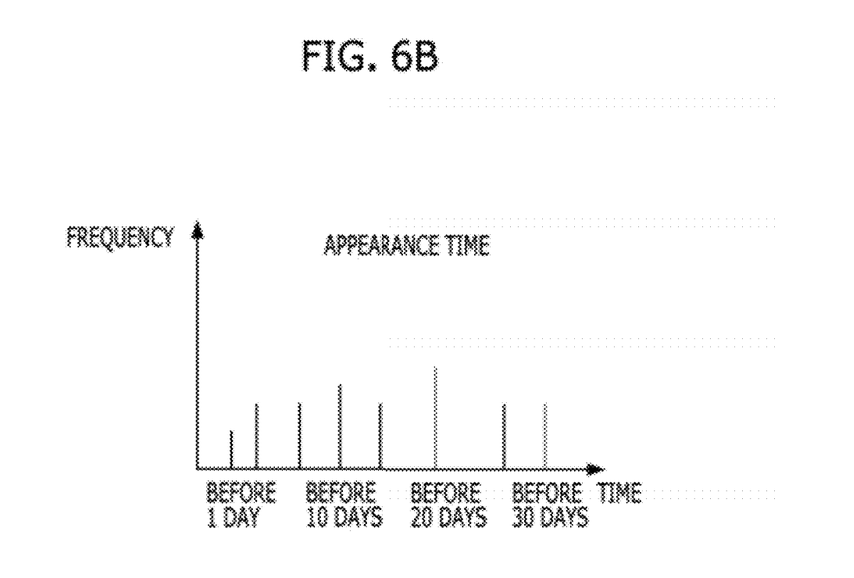

FIGS. 6A and 6B illustrate histograms for appearance intervals and previous appearance times in accordance with the embodiment of the present invention.

FIG. 6A illustrates a histogram for appearance intervals, and FIG. 6B illustrates a histogram for previous appearance times.

The time pattern extraction unit 53 generates histograms for respectively measuring a frequency of the appearance time and a frequency of the previous appearance times using information on the keyword appearance time of each of the keywords.

A user tends to search for web contents with respect to one keyword (or subject). Therefore, the user searches for web contents with respect to a keyword currently interested by the user, and thus the user's interested keyword is repeated in a very short period.

When measuring the frequency of the appearance interval, the time pattern extraction unit 53 reduces a statistical error due to the user's interested keyword having a very short period. To this end, the time pattern extraction unit 53 may set a representative time. For example, in a case where a specific keyword is generated five times at an interval of 6 minutes from '12 o'clock (midday),' the time pattern extraction unit 53 sets '12:15' as a representative time, and measures that the corresponding keyword appears 5 times at '12:15.'

Figure 7:
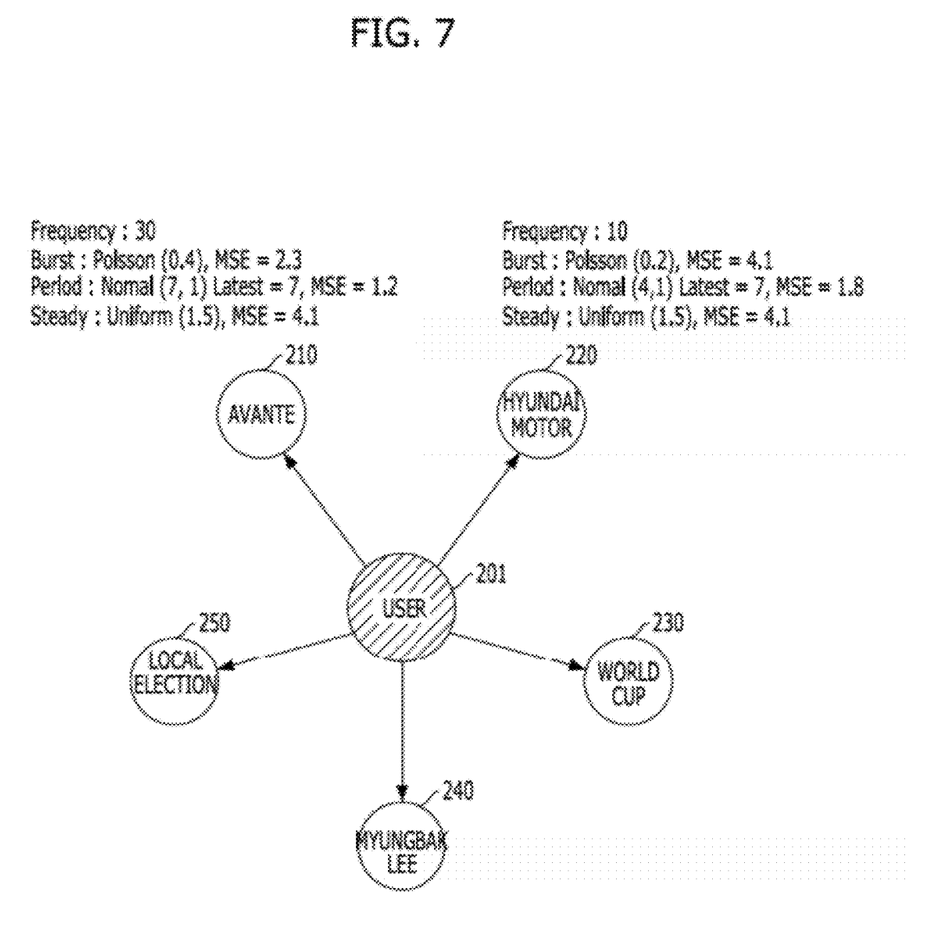
FIG. 7 illustrates a time pattern for keywords in accordance with the embodiment of the present invention.

FIG. 7 illustrates a time pattern for keywords in accordance with the embodiment of the present invention.

Referring to FIG. 7, there is illustrated a user interest pattern graph configured with keywords for a user. The user interest pattern graph includes a user 201 and keywords 210, 220, 230, 240 and 250. The keywords 210, 220, 230, 240 and 250 are keywords extracted from the contents provided to the user 201 (or the second terminal 12).

The first keyword 210 is 'Avante,' the second keyword 220 is 'Hyundai Motor,' the third keyword 230 is 'World Cup,' the fourth keyword 240 is 'Myungbak Lee,' and the fifth keyword 250 is 'Local Election.'

The time pattern extraction unit 53 extracts time patterns for the first and second keywords 210 and 220. Here, the time pattern includes, for example, a burst pattern, a period pattern and a steady pattern. The time pattern extraction unit 53 extracts the time pattern using the statistical probability distribution function.

For example, the time pattern extraction unit 53 may use a previous appearance time (e.g., a frequency of the previous appearance time) so as to obtain the burst pattern. In this case, the time pattern extraction unit 53 may calculate a lambda (λ) value (expectation of the number of appearances) through parameter estimation from the a Poisson probability distribution function. The time pattern extraction unit 53 may obtain a mean and variance through the parameter estimation from a normal distribution function based on an appearance interval (e.g., frequency of the appearance interval).

The time pattern extraction unit 53 obtains the mean and variance through the parameter estimation from a normal distribution function based on an appearance interval (e.g., frequency of the appearance interval) so as to obtain the period pattern. The time pattern extraction unit 53 extracts a peak value most recently generated based on the previous appearance time.

The time pattern extraction unit 53 calculates a mean through the parameter estimation from a uniform probability distribution function based on a previous appearance interval (e.g., frequency of the appearance interval) so as to obtain the steady pattern.

Each of the statistical probability distribution functions used for calculation in the time pattern extraction unit 53 has been described as an example, and a statistical probability distribution function selected from various statistical probability distribution functions may be used as each of the statistical probability distribution functions used for calculation in the time pattern extraction unit 53.

The time pattern extraction unit 53 calculates an error of the probability distribution estimated with respect to the histogram of the keyword to which the parameter estimation is applied. Here, the time pattern extraction unit 53 calculates, for example, a root mean square error (RMSE) or mean square error (MSE) for the purpose of error calculation.

For example, for the first keyword 210, the frequency extracted in the time pattern extraction unit 53 is '30.' The burst pattern extracted in the time pattern extraction unit 53 has a Poisson (0.4). In this case, the MSE calculated in the time pattern extraction unit 53 is '2.3.'

The period pattern extracted in the time pattern extraction unit 53 has a normal distribution (Normal) (7,1), and the peak value (Latest) most recently generated based on the appearance time is '7.' In this case, the MSE calculated in the time pattern extraction unit 53 is '1.2.'

The steady pattern extracted in the time pattern extraction unit 53 has a uniform distribution (Uniform) (1.5). In this case, the MSE calculated in the time pattern extraction unit 53 is '4.1.'

For the second keyword 220, the frequency extracted in the time pattern extraction unit 53 is '10.' The burst pattern extracted in the time pattern extraction unit 53 has a Poisson (0.2). In this case, the MSE calculated in the time pattern extraction unit 53 is '4.1.'

The period pattern extracted in the time pattern extraction unit 53 has a Normal (4, 1), and the Latest is '7.' In this case, the MSE calculated in the time pattern extraction unit 53 is '1.8.'

The steady pattern extracted in the time pattern extraction unit 53 has a Uniform (1.5). In this case, the MSE calculated in the time pattern extraction unit 53 is '4.1.'

The time pattern extraction unit 53 outputs the time pattern obtained using the obtained appearance time or previous appearance time to the time pattern analysis unit 55.

Figure 8:
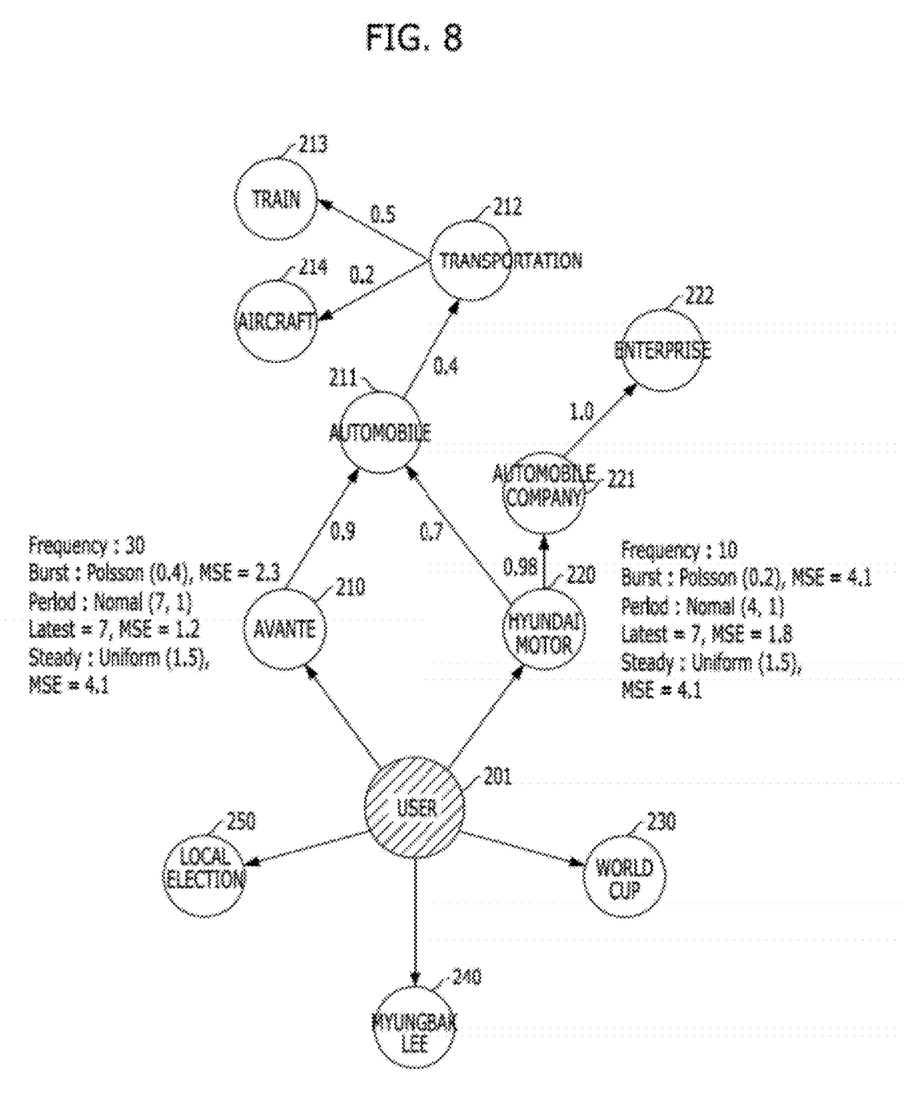
FIG. 8 illustrates extension of keywords in accordance with the embodiment of the present invention.

FIG. 8 illustrates extension of keywords in accordance with the embodiment of the present invention.

Referring to FIG. 8, there are illustrated a user interest pattern graph including extended keywords in the user interest pattern graphs. The user interest pattern graph includes keywords 210, 220, 230, 240 and 250 and extended keywords 211, 212, 213, 214, 221 and 222.

For example, keywords are extended based on the first and second keywords. The extension of the keywords may be performed through the keyword extension unit 54.

The keyword extension unit 54 obtains a first time pattern from the first keyword (Avante) 210 and the second keyword (Hyundai Motor) 220. The keyword extension unit 54 may obtain extended keywords in consideration of connection strengths (having values of 0 to 1, and the connection strength increases as the value increases) between extended keywords and between keywords and extended keywords searched from the knowledge base server 20. Here, the connection strength refers to a strength of relationship, which is measured as a rate of co-occurence between keywords.

The first extended keyword 211 is 'Automobile,' the second extended keyword 212 is 'Transportation,' the third extended keyword 213 is 'Train,' and the fourth extended keyword 214 is 'Aircraft.' The fifth extended keyword 221 is 'Automobile Company,' and the sixth extended keyword 222 is 'Enterprise.'

The keyword extension unit 54 outputs information on the extended keywords to the time pattern analysis unit 55. Since the extended keywords are keywords that do not appear in the content that is accessed by the user, the keyword extension unit 54 also outputs information on connection strengths between the extended keywords so as to obtain time patterns for the extended keywords.

The first extended keyword 211 has a connection strength of '0.9' with the first keyword 210, and has a connection strength of '0.7' with the second keyword 220. The second extended keyword 212 has a connection strength of '0.4' with the first extended keyword 211. The third extended keyword 213 has a connection strength of '0.5' with the second extended keyword 212. The fourth extended keyword 214 has a connection strength of '0.2' with the second extended keyword 212. The fifth extended keyword 221 has a connection strength of '0.98' with the second extended keyword 212. The sixth extended keyword 222 has a connection strength of '1.0' with the fifth extended keyword 221.

Figure 9:
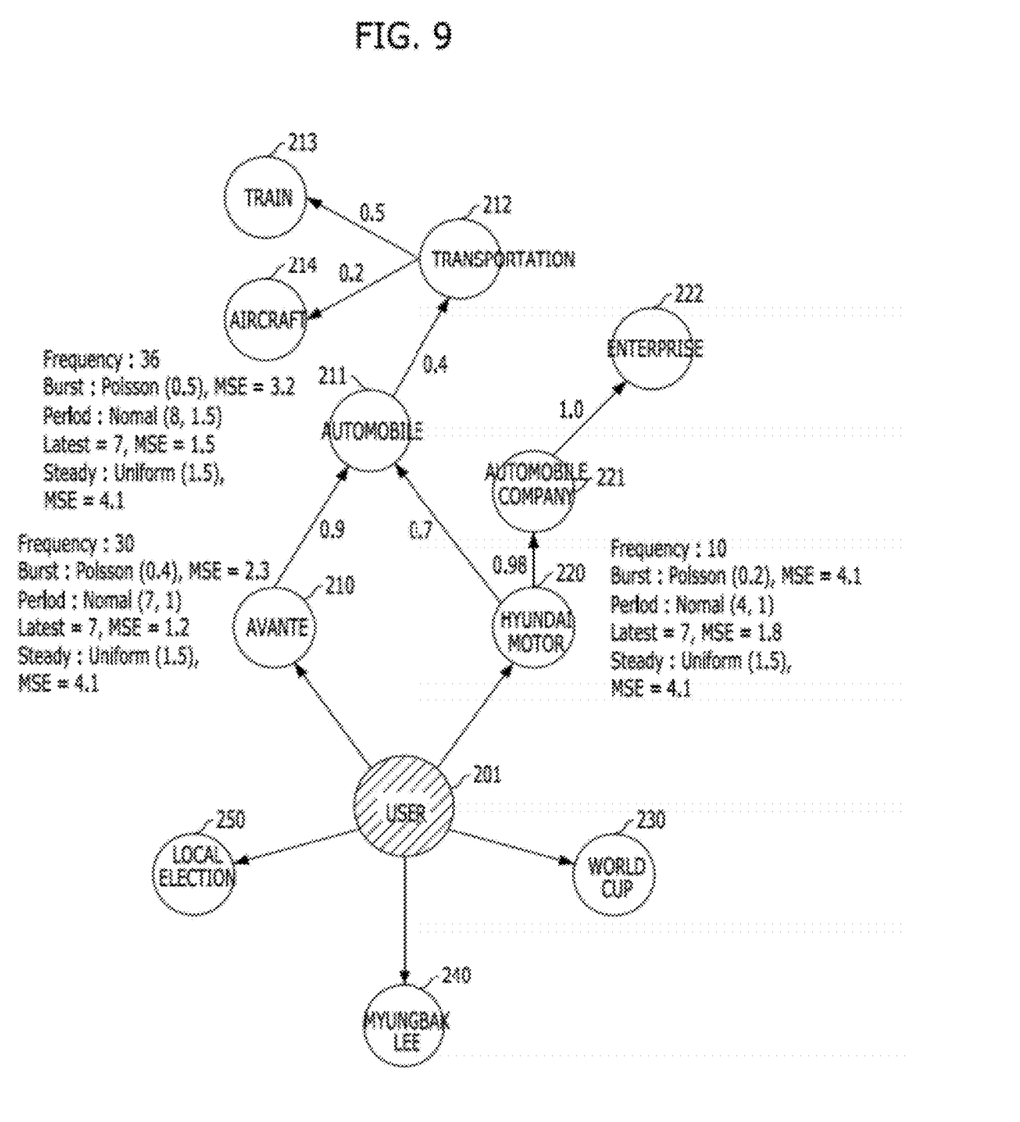
FIG. 9 illustrates time pattern calculation of extended keywords in accordance with the embodiment of the present invention.

FIG. 9 illustrates time pattern calculation of extended keywords in accordance with the embodiment of the present invention.

Referring to FIG. 9, a time pattern graph includes keywords 210, 220, 230, 240 and 250 and extended keywords 211, 212, 213, 214, 221 and 222.

Here, the time pattern analysis unit 55 analyzes a time pattern for the first extended keyword 211. The time pattern analysis unit 55 may analyze the time pattern based on connection relationships of the first extended keyword 211 with other keywords. The connection strength of the first extended keyword 211 with the first keyword 210 is '0.9,' and the connection strength of the first extended keyword 211 with the second keyword 220 is '0.7.'

The time pattern analysis unit 55 may represent the appearance frequency of the first extended keyword 211 as the multiplication of the connection strengths '0.9×0.7 (0.63)'. The time pattern analysis unit 55 may calculates frequencies (e.g., a frequency for the appearance interval and a frequency for the previous appearance time) based on the connection strengths.

Subsequently, the time pattern analysis unit 55 may analyze a time pattern of the extended keyword through an operation similar to that of the time pattern extraction unit 53. Here, the time pattern includes a burst pattern, a period pattern and a steady pattern. The operation of obtaining the time pattern of the extended keyword in the time pattern analysis unit 55 will be described with reference to the operation of the time pattern extraction unit 53.

For example, for the first extended keyword 211, the frequency extracted in the time pattern analysis unit is '36.' The burst pattern extracted in the time pattern analysis unit 55 has a Poisson (0.5). In this case, the MSE calculated in the time pattern analysis unit 55 is '3.2.'

The period pattern extracted in the time pattern analysis unit 55 has a Normal (8, 1.5), and the Latest is '7.' In this case, the MSE calculated in the time pattern analysis unit 55 is '1.5.'

The steady pattern extracted in the time pattern analysis unit 55 has a Uniform (1.5). In this case, the MSE calculated in the time pattern analysis unit 55 is '4.1.'

The time pattern analysis unit 55 may analyze a time pattern of the extended keyword through the analysis of the time pattern. The time pattern analysis unit 55 may provide a keyword, a time pattern of the keyword, an extended keyword and a time pattern of the extended keyword to the pattern modeling unit 56.

Meanwhile, the pattern modeling unit 56 may select a pattern having the minimum error obtained through the time pattern analysis. For example, the pattern modeling unit 56 may model, as a user interest pattern, a user interest pattern graph selecting the period pattern of which error is lowest.

Figure 10:
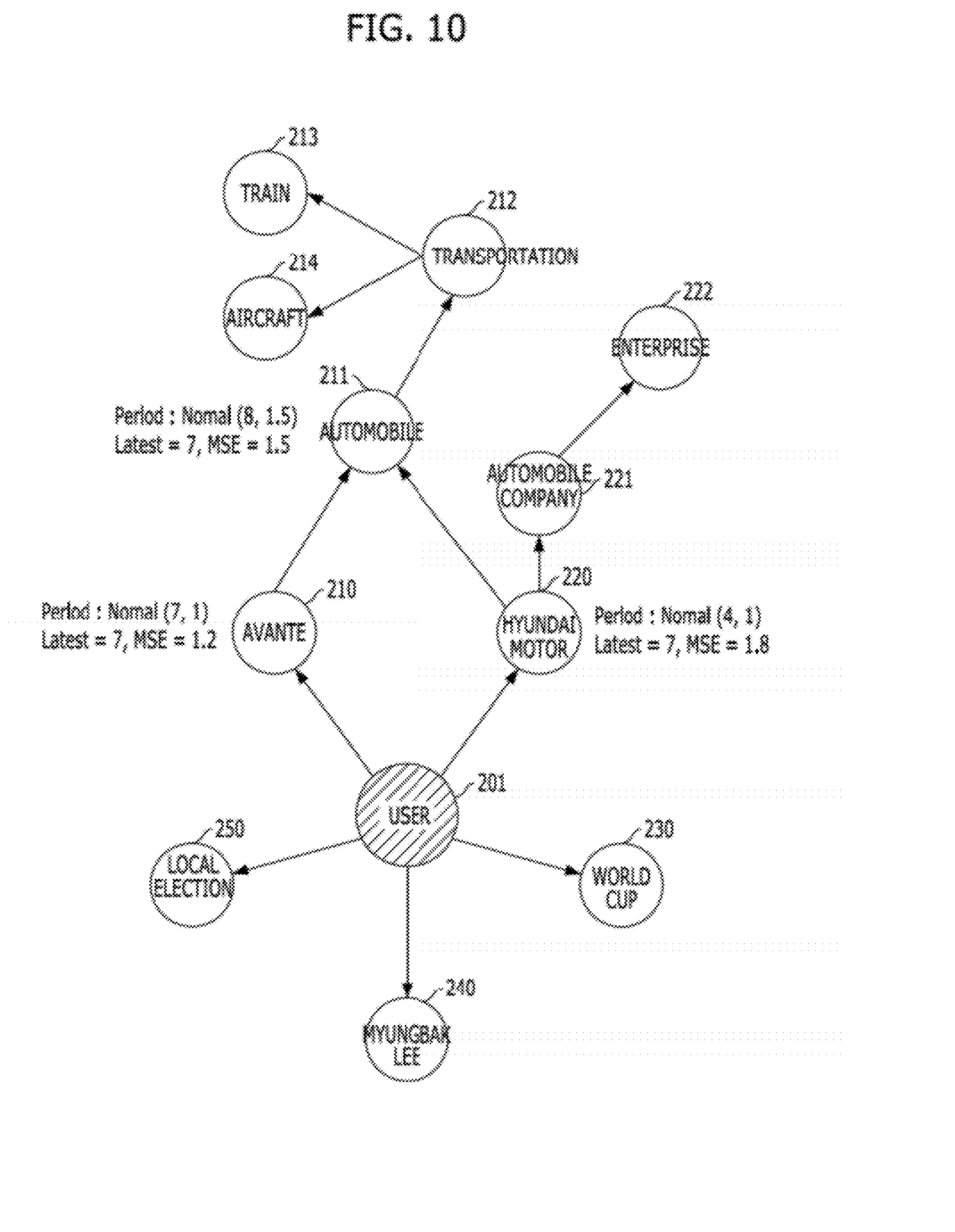
FIG. 10 illustrates a time pattern graph in accordance with the embodiment of the present invention.

FIG. 10 illustrates a time pattern graph in accordance with the embodiment of the present invention.

Referring to FIG. 10, the time pattern graph includes keywords 210, 220, 230, 240 and 250 and extended keywords 211, 212, 213, 214, 221 and 222.

The pattern modeling unit 56 models a user interest pattern through selection of the time pattern having the lowest MSE, e.g., the period pattern. The pattern modeling unit 56 may store the modeled user interest pattern in a memory (not shown), database (not shown), etc. in the user interest pattern modeling server 50, or may provide the modeled user pattern to each terminal, an application server, etc. in response to a request of the content providing system.

Since keywords or extended keywords not satisfying the minimum frequency do not have significance in the modeling of the user interest pattern, the pattern modeling unit 56 removes the keywords and extended keywords from the modeled user pattern. The pattern modeling unit 56 removes a time pattern not satisfying a predetermined MSE or RMSE from the modeled user pattern. The pattern modeling unit 56 may consider that the time pattern having the lowest MSE or RMSE best reflects the user interest characteristic depending on time.

For example, the time patterns for the first keyword 210, the second keyword 220 and the first extended keyword 211 are calculated in FIGS. 7 to 10. However, the time patterns for the other keywords 230, 240 and 250 and the other extended keywords 212, 213, 214, 221 and 222 are also calculated. The user interest pattern modeling server can model a user interest pattern through the time patterns calculated as described above.

Figure 11:
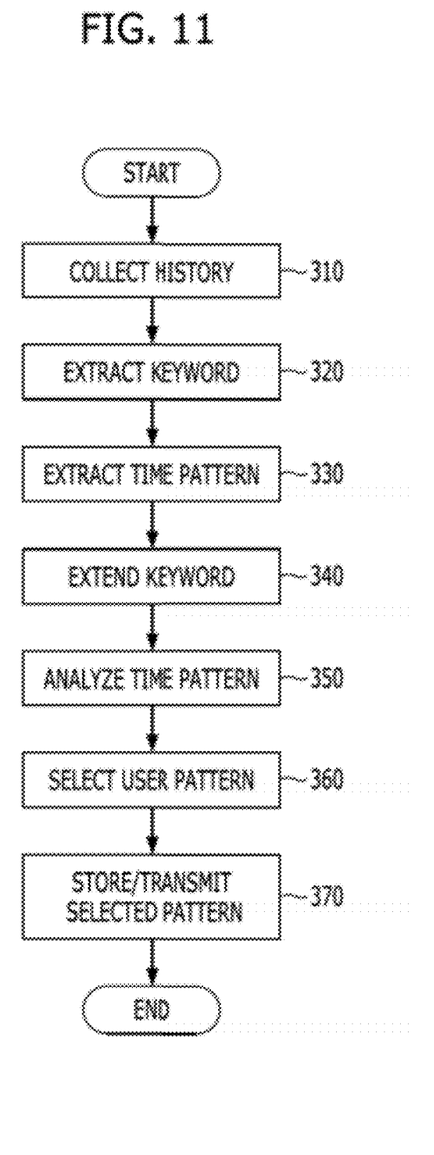
FIG. 11 is a flowchart illustrating an operation of modeling a user interest pattern in the user interest pattern modeling server illustrated in FIG. 2.

FIG. 11 is a flowchart illustrating an operation of modeling a user interest pattern in the user interest pattern modeling server illustrated in FIG. 2.

Referring to FIG. 11, at step 310, the history collection unit 51 collects a user's content use history. The history collection unit 51 may collects content use histories from the terminals 11, 12, 13 or the application servers 30 and 40. Here, the content use history includes text data or metadata contained in contents. The history collection unit 51 collects a content appearance time together with the corresponding content use history. The history collection unit 51 outputs the collected content use history to the keyword extraction unit 52.

At step 320, the keyword extraction unit 52 extracts keywords from the content use history. The keyword extraction unit 52 may extract keywords from the text data or metadata. In this case, the keyword extraction unit 52 may extract a keyword appearance time of a corresponding keyword from the content appearance time. The keyword extraction unit 52 may map the keywords and the keyword appearance times to each other. The keyword extraction unit 52 may provide the keywords and the keyword appearance times to the time pattern extraction unit 53 or the keyword extension unit 54.

As step 330, the time pattern extraction unit 53 extracts a time pattern for each of the keywords. The time pattern includes a burst pattern, a period pattern and a steady pattern. The content preference for a user depending on time can be identified through the time pattern. The time pattern extraction unit 53 includes a probability distribution function, e.g., one of a Poisson probability distribution function, a normal probability distribution function and a uniform probability distribution function. The time pattern extraction unit 53 may search for each of the time patterns using a function suitable for representing characteristics of the pattern. The time pattern extraction unit 53 may obtain an MSE for each of the burst, period and steady patterns.

The time pattern extraction unit 53 outputs the time patterns to the time pattern analysis unit 55.

At step 340, the keyword extension unit 54 generates extended keywords through extension of the keywords. The keyword extension unit 54 also generates information on connection strengths between the extended keywords and between the keywords and the extended keywords. For example, the keyword extension unit 54 obtains the extended keywords and the information on the connection strengths between the extended keywords through searching of the knowledge base server 20 implemented using the semantic web technique, etc. The keyword extension unit 54 outputs the extended keywords and the connection strengths to the time pattern analysis unit 55.

At step 350, the time pattern analysis unit 55 analyzes time patterns for the extended keywords. The time pattern analysis unit 55 the time patterns for the extended keywords based on the time patterns extracted in the time pattern extraction unit 53. The time pattern analysis unit 55 analyzes the time patterns based on connection strengths between the keywords and the extended keywords. Like the time pattern for the keyword, the time pattern for the extended keyword includes a burst pattern, a period pattern and a steady pattern.

The time pattern analysis unit 55 may obtain an MSE for each of the burst, period and steady patterns.

The time pattern analysis unit 55 outputs the time patterns to the pattern modeling unit 56.

At step 360, the pattern modeling unit 56 models a user interest pattern through selecting a time pattern having the minimum error obtained through the time pattern analysis. The pattern modeling unit 56 may model the user interest pattern for the time patterns of the keywords and the time patterns of the extended keywords. Here, the modeled user pattern reflects the interest of the user depending on time.

At step 370, the pattern modeling unit 56 may store the selected user's interest pattern in a memory or database. The pattern modeling unit 56 may transmit the user's interest pattern in response to a request for providing the user interest pattern.

As described above, the modeled user's interest pattern includes information describing the characteristics of a time pattern for the keyword or extended keyword. Thus, the user interest pattern modeling sever according to the present invention is connected to or included in the content providing server, so that it is possible to recommend or provide contents reflecting user's interest depending on time to the user.

In accordance with the exemplary embodiments of the present invention, the user interest pattern modeling server analyzes a user's content use history depending on time, so that it is possible to model a change in user's interest depending on the time. Further, the user interest pattern modeling server models a user pattern reflecting the user's interest depending on the time, so that it is possible to recommend, to the user, contents corresponding to the user's interest changed depending on the time.

While the present invention has been described with respect to the specific embodiments, it will be apparent to those skilled in the art that various changes and modifications may be made without departing from the spirit and scope of the invention as defined in the following claims.

What is claimed is:

1. A non-transitory computer readable medium having stored thereon a computer program for causing a computer to model a user interest pattern, the computer readable medium comprising:
   code for a history collection unit, the history collection unit being operable to collect a user's use history of a content;
   code for a keyword extraction unit, the keyword extraction unit being operable to extract a keyword from the use history of the content;
   code for a time pattern extraction unit, the time pattern extraction unit being operable to extract a first time pattern of the keyword;
   code for a keyword extension unit, the keyword extension unit being operable to extract an extended keyword through searching for related words of the keyword;
   code for a time pattern analysis unit, the time pattern analysis unit being operable to analyze a second time pattern of the extended keyword based on the first time pattern; and
   code for a pattern modeling unit, the pattern modeling unit being operable to model a user interest pattern for the keyword and the extended keyword based on the first and second time patterns.

2. The non-transitory computer readable medium of claim 1, wherein the content comprises at least one of a web content and a multimedia content.

3. The non-transitory computer readable medium of claim 1, wherein the history collection unit is operable to collect a user's content access time based on the use of the content.

4. The non-transitory computer readable medium of claim 3, wherein the history collection unit is operable to collect at least one of text data and metadata corresponding to the content.

5. The non-transitory computer readable medium of claim 4, wherein the keyword extraction unit is operable to extract the keyword from the text data and the metadata.

6. The non-transitory computer readable medium of claim 3, wherein the keyword extraction unit is operable to extract keyword appearance times for the extracted keyword from a content appearance time.

7. The non-transitory computer readable medium of claim 6, wherein the first time pattern comprises at least one of a burst pattern, a period pattern, and a steady pattern with respect to the keyword.

8. The non-transitory computer readable medium of claim 6, wherein the time pattern extraction unit is operable to obtain a time interval from a current time to the keyword appearance time and a time interval between the keyword appearance times, and to obtain the first time pattern from the time intervals using a statistical probability distribution function.

9. The non-transitory computer readable medium of claim 6, wherein the second time pattern comprises at least one of a burst pattern, a period pattern, and a steady pattern with respect to the extended keyword.

10. The non-transitory computer readable medium of claim 9, wherein the time pattern analysis unit is operable to obtain a time interval from the current time to an extended keyword appearance time and a time interval between extended keyword appearance times based on a connection strength between the keyword and the extended keyword, and to obtain the second time pattern from the time intervals using a statistical probability distribution function.

11. The non-transitory computer readable medium of claim 1, wherein the time pattern analysis unit is operable to model the user interest pattern based on the keyword, the extended keyword, the first time pattern, and the second time pattern.

12. The non-transitory computer readable medium of claim 1, wherein the time pattern analysis unit is operable to calculate a root mean square error (RMSE) or mean square error (MSE) for the first and second time patterns, and to model the user interest pattern through selection of a time pattern having a minimum RMSE or MSE.

13. A method for modeling a user interest pattern in a user interest pattern modeling server, the method comprising:
   collecting a user's use history of a content;
   extracting a keyword from the use history of the content;
   extracting a first time pattern of the keyword;
   generating an extended keyword from the keyword;
   analyzing a second time pattern of the extended keyword based on the first time pattern; and
   modeling a user interest pattern for the keyword and the extended keyword based on the first and second time patterns.

14. The method of claim 13, wherein said collecting of the use history of the content comprises collecting a user's content access time based on the use of the content.

15. The method of claim 13, wherein said extracting of the keyword comprises extracting keyword appearance times for the extracted keyword from the content access time.

16. The method of claim 13, wherein said extracting of the keyword comprises extracting the keyword from text data of the content and metadata of the content.

17. The method of claim 13, wherein the first time pattern comprises at least one of a burst pattern, a period pattern, and a steady pattern with respect to the keyword, and the second time pattern comprises at least one of a burst pattern, a period pattern, and a steady pattern with respect to the extended keyword.

* * * * *